Feb. 26, 1957 R. C. BUCK 2,783,057
COMBINATION GASOLINE INLET COVER AND
TAILLIGHT ASSEMBLY FOR AUTOMOBILES
Filed March 4, 1954 2 Sheets-Sheet 1
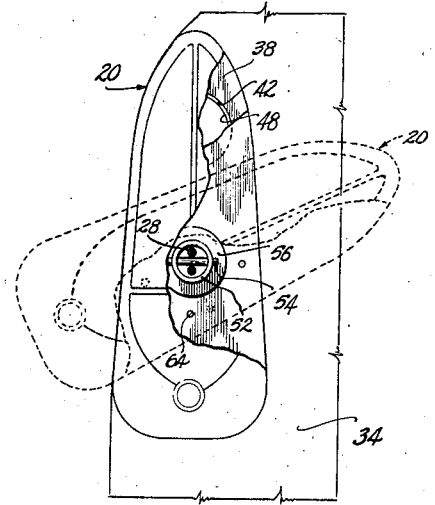
Fig. 1.
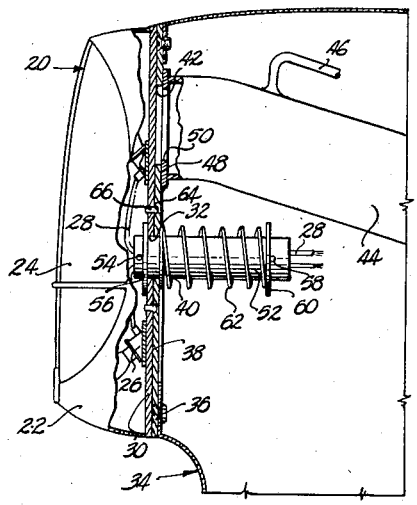
Fig. 2.
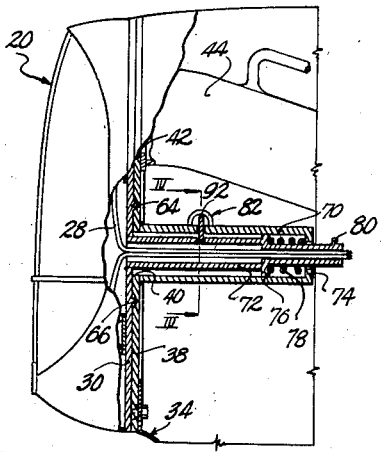
Fig. 3.
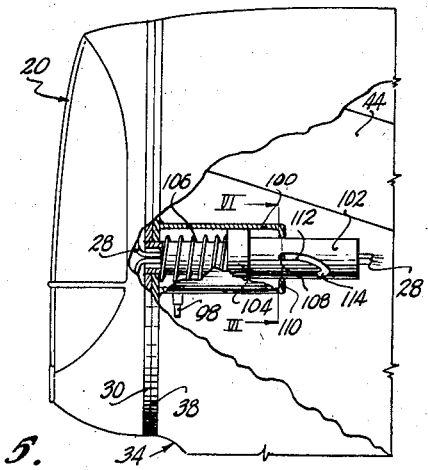
Fig. 5.
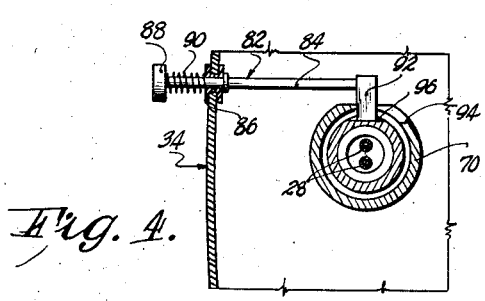
Fig. 4.
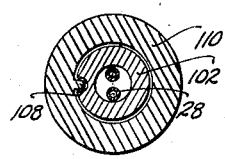
Fig. 6.
INVENTOR.
Robert C. Buck
BY
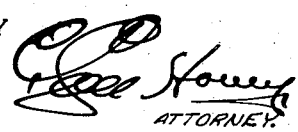
ATTORNEY.

Feb. 26, 1957  R. C. BUCK  2,783,057
COMBINATION GASOLINE INLET COVER AND
TAILLIGHT ASSEMBLY FOR AUTOMOBILES
Filed March 4, 1954  2 Sheets-Sheet 2

INVENTOR.
Robert C. Buck
BY
ATTORNEY.

400
United States Patent Office 2,783,057
Patented Feb. 26, 1957

2,783,057
COMBINATION GASOLINE INLET COVER AND TAILLIGHT ASSEMBLY FOR AUTOMOBILES

Robert C. Buck, Independence, Mo.

Application March 4, 1954, Serial No. 414,080

2 Claims. (Cl. 280—152)

This invention relates to automobiles, and more particularly, to structure for providing on automobiles a combination gasoline inlet cover and taillight assembly.

It is one of the more important objects of this invention to provide structure adaptable either for use in newly manufactured automobiles incorporating this invention, or in conversion kits for existing automobiles by which the conventional taillight components and covering bezel are mounted upon a first plate, a second plate attached to the body of the automobile is provided with a gasoline inlet opening coupled with the gasoline tank, and means are provided for swingably mounting the taillight bearing plate upon the gasoline inlet plate and for biasing the former to a position covering the gasoline inlet.

Another important object of this invention is to provide such structure wherein the taillight assembly carrying plate is movable in a direction normal to and away from the gasoline inlet plate against the action of means yieldably biasing said plates together.

Still another important object of this invention is to provide means by which the taillight assembly carrying plate can be moved away from and rotated relative to the gasoline inlet plate through the utilization of a vacuum line.

Another object of the invention is to provide suitable locking means for retaining the taillight assembly carrying plate in proper closing relationship over the gasoline inlet during periods when said plate is not moved to its position for permitting filling.

Another object of the invention is to provide spring biased, swingable door structure on the gasoline inlet plate adapted for opening automatically when the taillight assembly carrying plate is swung to its filling position and for being retained in closed position when the last mentioned plate is in its inlet covering position.

Still other important objects of this invention, including certain details of construction and the manner in which the structure of this invention is made economical to manufacture, easy to install and foolproof in operation, will be made clear or become apparent as the following description of the invention progresses.

In the accompanying drawings:

Figure 1 is a rear elevation view of one embodiment of this invention with parts broken away for clarity of illustration and showing in dotted lines the alternate or filling position of the taillight assembly carrying plate;

Fig. 2 is a side view, partially in elevation and partially in section, of the embodiment of the invention shown in Fig. 1, with parts being broken away for clarity of illustration;

Fig. 3 is a view similar to that of Fig. 2 showing another form of the invention;

Fig. 4 is an enlarged cross sectional view taken on line IV—IV of Fig. 3;

Fig. 5 is a view similar to Figs. 2 and 3 and showing still another form of the invention;

Fig. 6 is a cross sectional view taken on line VI—VI of Fig. 5;

Figures 9, 10, 11:
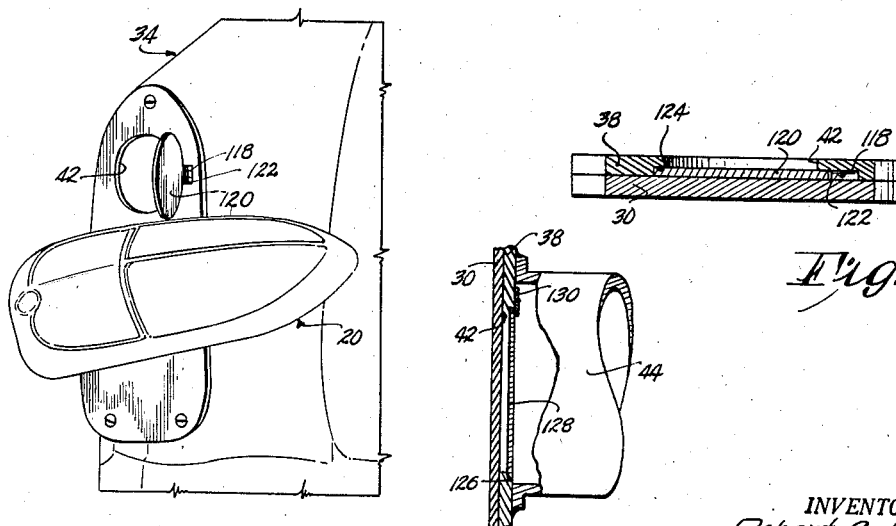
Fig. 9 is a cross sectional view taken on line IX—IX of Fig. 8.

Fig. 10 is a perspective view of the structure of that form of this invention including the swingable door in place upon an automobile and showing said door swung to its open position while the taillight assembly is in its position for permitting filling of the gasoline tank of the automobile; and Fig. 11 is a fragmentary view, partially in elevation and partially in section, of a modified door construction employing a door of magnetic material.

Referring first to Figs. 1 and 2 there is illustrated a somewhat basic embodiment of this invention particularly adapted for use in applying the principles of this invention to existing automobiles since it minimizes the changes required to be made in the conventionally provided structure and utilizes to a maximum extent the structural elements already provided in the automobile. The numeral 20 broadly indicates a taillight assembly having a bezel 22 including transparent portions 24 and conventional lamp and socket structure 26 having associated therewith a number of wires 28. Assembly 20 is mounted upon a back plate 30 having a perforation 32 formed therein.

The numeral 34 broadly indicates the body of an automobile having a gasoline tank (not shown). Secured to body 34 by bolts 36 as shown or by welding or other suitable means, is a mounting plate 38 provided with a perforation 40 and an inlet opening 42. Communicating with inlet opening 42 is a gasoline filler tube 44 having a breather tube 46. Filler tube 44 may be welded to a water deflector ring 48 provided with an annular hole 50 having a smaller diameter than inlet opening 42, ring 48 being in turn welded or otherwise suitably secured to mounting plate 38 with hole 50 concentric with opening 42. It may be observed that ring 48 functions to prevent any rain or the like which might pass between plates 30 and 38 from entering filler tube 44. Filler tube 44 is preferably formed with a metallic portion as shown adjacent plate 38 and ring 48 and with a flexible hose portion (not shown), extending to the gasoline tank of the automobile.

Plate 30 is yieldably and rotatably attached to plate 38 by means of a tubular element 52 extending through perforation 32 of plate 30 and perforation 40 of plate 38. Element 52 is elongated and provided with a retaining pin 54 adjacent that end thereof on the side of plate 30 opposite plate 38, there being a washer 56 between pin 54 and plate 30. A similar retaining pin 58 and washer 60 are provided adjacent the opposite end of element 52 in spaced relationship to plate 30. A spring 62 is disposed around element 52 between plate 38 and washer 60 and functions to yieldably bias element 52 toward the position shown in Fig. 2. When in such last mentioned position, element 52 holds plate 30 in engagement with plate 38 to close inlet opening 42. Plate 38 is preferably provided with a number of indentations 64 adapted to cooperate with a number of pins 66 or detents carried by plate 30, said pins 66 being adapted to extend within cavities 64 when plate 30 is in its properly aligned closing position relative to plate 38 in order to prevent accidental displacement of plate 30 by vibration or the like. It will be noted that wires 28 pass through the tubular element 52.

It will now be seen that all that is required to incorporate this invention into most types of existing automobiles is to remove the taillight assembly 20 thereof, either provide a new back plate 30 for the assembly 20 or form a perforation 32 in the old back plate 30, supply a mounting plate 38 having a perforation 32 and an inlet opening 42 therein, secure inlet tube 44 to plate 38 in communication with opening 42, and provide element 52 having end stop means 54—56 and 58—60 and provided with a biasing spring 62.

Referring now to Figs. 3 and 4 the modified construction shown varies from that of Fig. 1 and Fig. 2 in that tubular extension 70 extends laterally from plate 38 in communication with perforation 40 of the latter, extension 70 being preferably welded to plate 38. A tubular extension 72 also extends laterally from plate 30 in the direction of plate 38 and is adapted to reciprocate within extension 70 and extend beyond a bearing end 74 of the latter. Extension 72 is shouldered as at 76 to provide a sliding fit between extension 72 and extension 70. A spring 78 is disposed within extension 70 and bears upon shoulder 76 of extension 72 and end 74 of extension 70 to bias extension 72 toward the left in Fig. 3. A suitable stop 80 is provided on extension 72 beyond end 74 of extension 70 to limit the travel of extension 72 under the influence of spring 78.

Lock means generally designated 82 for holding extension 72 in a position disposing plate 30 in covering relationship to inlet opening 42 includes an elongated rod 84 extending through and suitably journalled for reciprocation in a hole 86 in body 34. Rod 84 is provided with an operating knob 88 exteriorly of body 34 and with a spring 90 yieldably biasing rod 84 toward the position shown in Fig. 4. At the opposite end of rod 84 is provided a latch 92 which extends through a slot 94 in extension 70 and, when in locking position, into sector groove 96 formed in extension 72. When knob 88 is pressed toward wall 44 against the action of spring 90 rod 84 reciprocates to move latch 92 out of groove 96, whereupon extension 72 moves in a leftward direction as shown in Fig. 3 under the influence of spring 78 to clear detents 66 from cavities 74 and permit rotation of extension 72 to move plate 30 out of covering relationship with filling opening 42. When plate 30 is returned to its covering position latch 92 is automatically moved into locking position within groove 96 by the action of spring 90. It will be appreciated by those skilled in the art that latch 92 could be operated by a solenoid and that the locking mechanism 82 could be disposed entirely within body 34 if a construction which could be unlocked only from inside the automobile were desired.

Referring now to Figs. 5 and 6, there is shown a form of the invention adapted to be operated from a vacuum line 98 which may be connected with the vacuum system of the automobile. A tubular extension 100 extends laterally from plate 38 in a direction away from plate 30, and a tubular extension 102 extends laterally in the same direction from plate 30. Extension 102 is provided with an annular shoulder 104 presenting a piston within extension 100. Vacuum line 98 communicates with the interior of extension 100 between plate 38 and piston 104. A spring 106 disposed around extension 102, within extension 100 between plate 38 and shoulder 104 and bearing upon each of the latter yieldably biases extension 102 in a direction toward the right as shown in Fig. 5. Suitable packing means (not shown), may obviously be provided within extension 100 adjacent plate 38 and in association with piston shoulder 104 in order to render the space within extension 100 between piston 104 and plate 38 substantially airtight.

A guide pin 108 is provided on extension 100 and may preferably take the form of an inwardly extending nib on an annular ring 110 provided at the end of extension 100 remote from plate 38. Pin or nib 108 extends into a groove 112 formed in extension 102, groove 112 being curved in one direction and provided with a reverse portion 114 adjacent its rightmost end as shown in Fig. 5.

As a vacuum is applied to the chamber within extension 100 between plate 38 and piston 104 through vacuum line 98, piston 104 will be drawn against the action of spring 106 toward plate 38 thereby reciprocating extension 102 and plate 30 in a direction toward the left as shown in Fig. 5. As plate 30 moves away from plate 38, the curvature of groove 112 will cause extension 102 to rotate swinging assembly 20 in one direction to clear filling opening 42, such action being caused by the fact that stationary nib 108 is riding within groove 112. As extension 102 reaches the leftmost end of its path of travel as shown in Fig. 5, the vacuum applied through line 98 may be cut off, whereupon spring 106 will act to reciprocate extension 102 a short distance toward the right as shown in Fig. 5, to place nib 108 in the reverse portion 114 of groove 112, assembly 20 thereby being held in its reciprocated and rotated position clearing filling opening 42. After the filling operation is completed, the operator may pull lightly upon assembly 20 and commence to rotate the same in the direction of curvature of groove 112, whereupon spring 106 will take over and return extension 102 and assembly 20 to their normal, inlet covering positions.

Figures 7, 8:
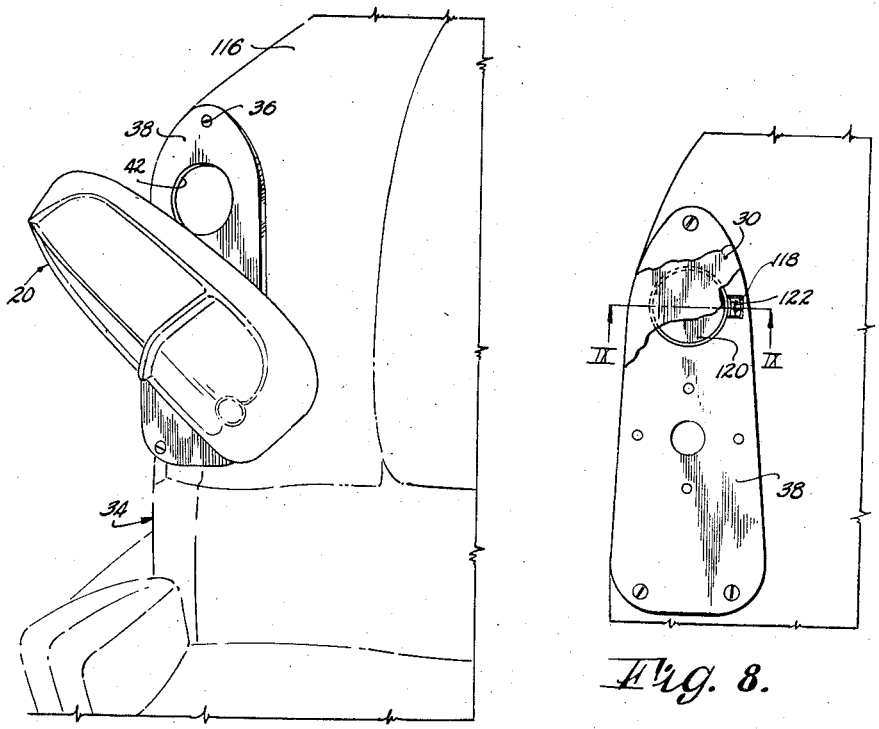
Fig. 7 is a perspective view of the structure of this invention in place upon an automobile and showing the taillight assembly swung to one side for filling of the gasoline tank of the automobile.
Fig. 8 is a rear elevation view of the structure of a modified form of this invention embodying a swingable door in association with the gasoline inlet, the taillight assembly being substantially broken away for clarity of illustration.

Fig. 7 illustrates either of the above-mentioned forms of the invention as it might appear when installed upon the body 34 of an automobile, it being noted that assembly 20 may be adapted to rotate in either direction relative to filling opening 42 of mounting plate 38 and that the latter may conveniently be placed at the rear of a fender 116 such as are common in current model automobiles.

Referring to Figs. 8, 9 and 10 there is shown a modification which may be utilized in conjunction with either of the embodiments of the invention heretofore described in which mounting plate 38 has swingably secured thereto by a hinge 118 a swingable door 120 disposed to close inlet opening 42 of plate 38. Hinge means 118 preferably includes a spring 122 adapted to yieldably bias door 120 to an open position uncovering inlet opening 42 as best illustrated in Fig. 10. It may be noted that plate 38 should be shouldered as at 124 adjacent inlet opening 42 to provide a seat for door 120, or, alternately, it will be obvious to those skilled in the art that such seat could be provided by the water ring 50 shown in Fig. 2.

In the preferred form of this modification, assembly 20 is adapted to be swung in the direction of hinge 118 so that spring 122 will automatically open door 120 uncovering inlet opening 42 as the swinging of assembly 20 progresses. Moreover, although door 120 may be manually closed by an operator before assembly 20 is returned to its covering position, the construction is preferably as shown so that, as assembly 20 is swung back toward its covering position, it will engage door 120 and swing the latter back to its covering, seated position against the shoulder 124 adjacent opening 42 in plate 38. Such construction obviously provides a double seal upon the inlet opening 42 of filling tube 44.

Referring to Fig. 11 there is shown a modified form of door construction wherein the inlet opening 42 in mounting plate 38 is shouldered as at 126 to present an internal seat on plate 38 within tube 44 for a swingable door 128 mounted upon plate 38 by a hinge 130. It will be noted that hinge 130 mounts door 128, which is preferably in the form of an annular disc, for swinging movement about a horizontal axis of pivot disposed above door 128. Thus, door 128 will tend to remain closed and seated upon shoulder 126 by virtue of the action of gravity. Additionally, however, door 128 is preferably formed, in whole or in part, of magnetic material carrying a permanent magnetization, and plate 38 adjacent opening 42 is formed of iron or some other material to which the magnetic material of door 128 will be attracted. Accordingly, door 128 is normally swung to the position shown in Fig. 11 by the action of gravity and the magnetic attraction between door 128 and plate 38 then draw door 128 into tightly seated engagement with shoulder 126 to present a seal. During filling, the gasoline delivery nozzle of a gasoline pump may be passed through opening 42 and into engagement with swingable door 128 thereby swinging the latter to a position for clearing the nozzle during filling. When the nozzle is withdrawn door 128 will effect a seal as hereinabove described.

It will now be appreciated that this invention provides a simple, inexpensive, attractive and most useful structural means by which conventional gasoline caps on automobiles may be eliminated and their function served by a combination gasoline inlet cover and taillight assembly. It will be obvious to those skilled in the art that many minor modifications and changes may be made in certain details of construction of this invention without materially departing from the true spirit or intention thereof. Accordingly, it is desired that this invention shall be considered limited only by the scope of the appended claims.

Having thus described the invention, what is claimed as new and desired to be secured by Letters Patent is:

1. For an automobile having a gasoline tank and taillight structure including connecting wires, a combination gasoline inlet cover and taillight assembly comprising a first plate adapted for mounting on the automobile and having an opening and a perforation therethrough; a filling tube in communication with the opening of said plate and adapted for coupling with said tank; a second plate adapted to carry said taillight structure and having a perforation therethrough; a tubular element extending through said perforations of said plates and adapted to pass said wires; stop means on the element adjacent that extremity thereof remote from said first plate, said stop means being adapted to limit travel in one direction of the element relative to said second plate; means projecting from the element adjacent the opposite extremity thereof; and resilient means disposed between said first plate and said projecting means for yieldably biasing the element in the direction of said opposite extremity thereof to a normal position disposing said second plate in covering relationship with the opening of said first plate.

2. In apparatus as set forth in claim 1, wherein said first plate is of magnetically attractable material, and there is provided a door of magnetic material hingedly mounted on said first plate within said tube for swinging movement on a horizontal axis above said door between a position closing said opening and a position clearing said opening for filling of said tank.

References Cited in the file of this patent

UNITED STATES PATENTS

| | | |
|---|---|---|
| 830,611 | Murray | Sept. 11, 1906 |
| 2,314,710 | Keller | Mar. 23, 1943 |
| 2,439,978 | Konchan | Apr. 20, 1948 |
| 2,598,670 | Bentley | June 3, 1952 |
| 2,615,117 | Tillapaugh | Oct. 21, 1952 |

FOREIGN PATENTS

| | | |
|---|---|---|
| 29,317 | Great Britain | 1913 |